United States Patent
Yamada et al.

(10) Patent No.: US 9,556,847 B2
(45) Date of Patent: Jan. 31, 2017

(54) PLASMA IGNITION DEVICE AND PLASMA IGNITION METHOD

(75) Inventors: Tatsunori Yamada, Aichi (JP); Kohei Katsuraya, Aichi (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 709 days.

(21) Appl. No.: 13/822,959

(22) PCT Filed: Sep. 1, 2011

(86) PCT No.: PCT/JP2011/004912
§ 371 (c)(1),
(2), (4) Date: Mar. 13, 2013

(87) PCT Pub. No.: WO2012/066708
PCT Pub. Date: May 24, 2012

(65) Prior Publication Data
US 2013/0167789 A1 Jul. 4, 2013

(30) Foreign Application Priority Data
Nov. 16, 2010 (JP) .................. 2010-255739

(51) Int. Cl.
| F02P 15/00 | (2006.01) |
| F02P 23/00 | (2006.01) |
| F02P 3/01 | (2006.01) |
| H01T 13/50 | (2006.01) |
| F02P 3/08 | (2006.01) |

(52) U.S. Cl.
CPC ................. F02P 23/00 (2013.01); F02P 3/01 (2013.01); H01T 13/50 (2013.01); F02P 3/08 (2013.01)

(58) Field of Classification Search
USPC ............. 123/143 R, 169 EL, 169 EB, 169 E, 154,123/156, 160, 161, 146.5 A, 143 B, 179.5
See application file for complete search history.

(56) References Cited

U.S. PATENT DOCUMENTS

| 3,934,566 A | 1/1976 | Ward |
| 4,138,980 A | 2/1979 | Ward |
| 4,774,914 A * | 10/1988 | Ward ............................ 123/162 |
| 5,604,441 A * | 2/1997 | Freese .................. G01N 27/221 324/663 |

(Continued)

FOREIGN PATENT DOCUMENTS

| JP | 51-077719 A | 7/1976 |
| JP | 2008-175197 A | 7/2008 |

(Continued)

OTHER PUBLICATIONS

International Search Report of PCT/JP2011/004912, dated Nov. 29, 2011.

Primary Examiner — Hung Q Nguyen
Assistant Examiner — Ruben Picon-Feliciano
(74) Attorney, Agent, or Firm — Sughrue Mion, PLLC (57) ABSTRACT

A plasma ignition device 20 includes a spark plug 100, a DC power supply 210, an AC power supply 220, and a coupling section 300. The coupling section 300 includes a capacitor 320 which electrically connects the AC power supply 220 to the spark plug 100. The coupling section 300 reduces the capacitance of the capacitor 320 in the second ignition mode in which transmission of AC power is halted, as compared with that in the first ignition mode in which AC power is transmitted to the spark plug 100.

11 Claims, 7 Drawing Sheets (56) References Cited

U.S. PATENT DOCUMENTS

| | | | |
|---|---|---|---|
| 6,488,017 B1* | 12/2002 | Pretorius et al. | 123/642 |
| 7,387,115 B1 | 6/2008 | Katoh et al. | |
| 2007/0114898 A1* | 5/2007 | Nagasawa et al. | 313/141 |
| 2008/0149083 A1 | 6/2008 | Katoh et al. | |
| 2010/0196208 A1 | 8/2010 | Makita et al. | |
| 2010/0206277 A1 | 8/2010 | Kajita | |

FOREIGN PATENT DOCUMENTS

| | | |
|---|---|---|
| JP | 2009-036198 A | 2/2009 |
| JP | 2010-216467 A | 9/2010 |

\* cited by examiner

PLASMA IGNITION DEVICE AND PLASMA IGNITION METHOD

CROSS REFERENCE TO RELATED APPLICATIONS

This is a National Stage of International Application No. PCT /JP2011/004912 filed Sep. 1, 2011, claiming priority based on Japanese Patent Application No. 2010-255739 filed Nov. 16, 2010, the contents of all of which are incorporated herein by reference in their entirety.

TECHNICAL FIELD

The present invention relates to a plasma ignition device for providing ignition through generation of spark discharge and AC plasma between electrodes of a spark plug (ignition plug).

BACKGROUND ART

A conventionally proposed plasma ignition device includes a DC power supply for generating DC power used to generate spark discharges, and an AC power supply for generating AC power used to generate AC plasma, and is configured such that the DC power and the AC power are coupled together and transmitted to a spark plug (refer to, for example, Patent Documents 1 and 2). In such a plasma ignition device, in order to restrain flow of DC power to the AC power supply, the AC power supply is electrically connected to the DC power supply and to the spark plug via a capacitor.

PRIOR ART DOCUMENTS

Patent Documents

Patent Document 1: Japanese Patent Application Laid-Open (kokai) No. S51-77719
Patent Document 2: Japanese Patent Application Laid-Open (kokai) No. 2009-36198

SUMMARY OF THE INVENTION

Problems to be Solved by the Invention

However, the capacitor used to block flow of DC power to the AC power supply accumulates charges when a spark discharge is to be generated, and increases rush current at the early stage of discharge, thereby raising a problem of accelerating erosion of an electrode caused by spark discharges.

In view of the above-mentioned problem, an object of the present invention is to provide a technique for improving the service life of a spark plug used to generate spark discharges and AC plasma.

Means for Solving the Problems

To solve, at least partially, the above problem, the present invention can be embodied in the following modes or application examples.

[Application Example 1] A plasma ignition device of application example 1 comprises a spark plug; a DC power supply for generating DC power used to generate spark discharge between electrodes of the spark plug; an AC power supply for generating AC power used to generate AC plasma between the electrodes between which the spark discharge has been generated; and a coupling section which couples the DC power and the AC power together and transmits resultant coupled power to the spark plug and which includes a capacitor for electrically connecting the AC power supply to the DC power supply and to the spark plug. The plasma ignition device is characterized by further comprising a power supply control section for controlling the DC power supply and the AC power supply while making a changeover between a first ignition mode in which the AC power is transmitted to the spark plug, and a second ignition mode in which transmission of the AC power to the spark plug is halted, and a capacitance control section for reducing, in the second ignition mode, capacitance of the capacitor as compared with that in the first ignition mode. According to the plasma ignition device of application example 1, in the second ignition mode in which transmission of AC power is halted, rush current at the early stage of discharge reduces as compared with the first ignition mode, whereby erosion of an electrode caused by spark discharges can be restrained. As a result, the spark plug which generates spark discharges and AC plasma can be improved in service life.

[Application Example 2] In the plasma ignition device of application example 1, the capacitor may have a capacitance of 35 pF (picofarad) or less in the second ignition mode. According to the plasma ignition device of application example 2, erosion of an electrode caused by spark discharges can be further restrained.

[Application Example 3] In the plasma ignition device of application example 1 or 2, a frequency f of the AC power may satisfy a relational expression 50 kHz≤f≤100 MHz, and the capacitor may have a capacitance of 0.0005 (F·Hz (farad hertz))/f or more in the first ignition mode. According to the plasma ignition device of application example 3, in the first ignition mode, sufficient AC power transmission efficiency can be ensured.

[Application Example 4] In the plasma ignition device of any one of application examples 1 to 3, the capacitor may be a variable capacitor whose capacitance can be varied, and the capacitor may include a first electrode electrically connected to the AC power supply; a second electrode electrically connected to the spark plug; a dielectric provided between the first electrode and the second electrode; and an electromagnetic actuator for moving at least one of the first electrode and the second electrode in response to a control signal from the capacitance control section. According to the plasma ignition device of application example 4, varying the capacitance of the capacitor can sufficiently follow a changeover between the first ignition mode and the second ignition mode.

[Application Example 5] In the plasma ignition device of application example 4, a surface of the first electrode and a surface of the dielectric which face each other, and a surface of the second electrode and a surface of the dielectric which face each other, may be planes. According to the plasma ignition device of application example 5, the capacitor can be reduced in size.

[Application Example 6] In the plasma ignition device of application example 4, the first electrode may have a circular columnar shape; the dielectric may have such a cylindrical shape as to surround an external circumference of the first electrode; and the second electrode may have such a cylindrical shape as to surround an external circumference of the dielectric. According to the plasma ignition device of application example 6, the capacitor can have such a circular columnar shape as to be compatible with a plug hole of an internal combustion engine which accommodates a spark plug, whereby the capacitor can be readily mounted into the plug hole.

[Application Example 7] In the plasma ignition device of application example 4, the second electrode may have a circular columnar shape; the dielectric may have such a cylindrical shape as to surround an external circumference of the second electrode; and the first electrode may have such a cylindrical shape as to surround an external circumference of the dielectric. According to the plasma ignition device of application example 7, the capacitor can have such a circular columnar shape as to be compatible with a plug hole of an internal combustion engine which accommodates a spark plug, whereby the capacitor can be readily mounted into the plug hole.

[Application Example 8] In the plasma ignition device of any one of application examples 4 to 7, an electrode moved by the electromagnetic actuator may come into close proximity to the dielectric in the first ignition mode and may form a gap in relation to the dielectric in the second ignition mode. According to the plasma ignition device of application example 8, variation in capacitance with the distance between the first electrode and the second electrode can be increased.

[Application Example 9] In the plasma ignition device of any one of application examples 4 to 8, the gap between the dielectric and at least one of the first electrode and the second electrode may be filled with insulation oil. According to the plasma ignition device of application example 9, the dielectric strength of the capacitor can be improved.

[Application Example 10] In the plasma ignition device of any one of application examples 4 to 9, the capacitor may be sealed in an insulation material. According to the plasma ignition device of application example 10, the dielectric strength of the capacitor can be improved.

[Application Example 11] Application example 11 provides a plasma ignition method in which spark discharge is generated between electrodes of a spark plug by means of DC power generated by a DC power supply, and, by means of AC power generated by an AC power supply, AC plasma is generated between the electrodes between which the spark discharge has been generated. The plasma ignition method is characterized in that the DC power supply and the AC power supply are controlled while a changeover is made between a first ignition mode in which the AC power is transmitted to the spark plug, and a second ignition mode in which transmission of the AC power to the spark plug is halted, and that a capacitor which electrically connects the AC power supply to the DC power supply and to the spark plug is reduced in capacitance in the second ignition mode as compared with the first ignition mode. According to the plasma ignition method of application example 11, in the second ignition mode in which transmission of AC power is halted, rush current at the early stage of discharge reduces as compared with the first ignition mode, whereby erosion of an electrode caused by spark discharges can be restrained. As a result, the spark plug which generates spark discharges and AC plasma can be improved in service life.

Modes for carrying out the present invention are not limited to the plasma ignition device and the plasma ignition method. For example, the present invention can be applied to various other modes, such as an internal combustion engine having the plasma ignition device, and a computer program for controlling the plasma ignition device. Also, the present invention is not limited to the above-mentioned modes, but may be embodied in various other modes without departing from the gist of the invention.

MODES FOR CARRYING OUT THE INVENTION

In order to provide a thorough understanding of the above-mentioned configurations and actions of the present invention, a plasma ignition device to which the present invention is applied will be described.

A. Embodiment

Figure 1:
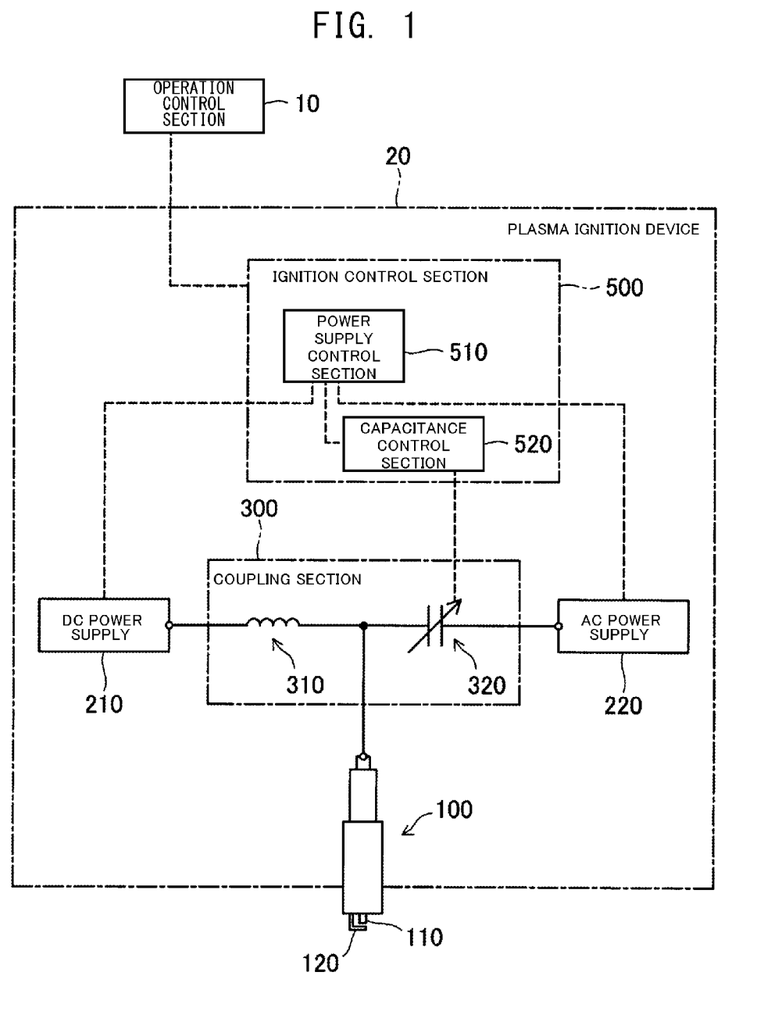
FIG. 1 Explanatory view showing a plasma ignition device.

FIG. 1 is an explanatory view showing a plasma ignition device 20. The plasma ignition device 20 includes a spark plug 100, a DC power supply 210, an AC power supply 220, a coupling section 300, and an ignition control section 500.

The spark plug 100 of the plasma ignition device 20 includes a center electrode 110 and a ground electrode 120 and is mounted to an internal combustion engine (not shown). The center electrode 110 of the spark plug 100 is electrically connected to the DC power supply 210 and to the AC power supply 220 via the coupling section 300. The ground electrode 120 of the spark plug 100 is electrically grounded.

The plasma ignition device 20 ignites an air-fuel mixture through generation of spark discharges and AC plasma between the center electrode 110 and the ground electrode 120 of the spark plug 100. In the present embodiment, the plasma ignition device 20 is electrically connected to an operation control section 10 for controlling the operation of the internal combustion engine, and performs ignition control according to the state of operation of the internal combustion engine in response to control signals output from the operation control section 10. According to the present embodiment, in a state of operation which requires relatively high ignition energy, the plasma ignition device 20 performs ignition control in the first ignition mode in which AC plasma is generated after generation of spark discharge, whereas, in a state of operation in which relatively low ignition energy suffices, the plasma ignition device 20 performs ignition control in the second ignition mode in which only spark discharge is generated without generation of AC plasma.

The DC power supply 210 of the plasma ignition device 20 generates DC power used to generate spark discharge between the electrodes of the spark plug 100. In the present embodiment, DC power generated by the DC power supply 210 is of high-voltage pulses of tens of thousands of volts. DC power generated by the DC power supply 210 is not limited to strict DC power, but may be low-frequency power whose frequency is equal to or smaller than one hundredth of the frequency of AC power generated by the AC power supply 220. In the present embodiment, the DC power supply 210 is a power supply which uses an ignition coil.

The AC power supply 220 of the plasma ignition device 20 generates AC power used to generate AC plasma between the electrodes of the spark plug 100 between which spark discharge has been generated. In the present embodiment, in order to generate AC plasma, preferably, AC power generated by the AC power supply 220 has a frequency f which satisfies the relational expression "50 kHz (kilohertz) ≤f≤100 MHz (megahertz)."

The coupling section 300 of the plasma ignition device 20 couples DC power generated by the DC power supply 210 and AC power generated by the AC power supply 220 together and transmits resultant coupled power to the spark plug 100. The coupling section 300 includes an inductor (coil) 310 and a capacitor 320.

The inductor 310 of the coupling section 300 electrically connects the DC power supply 210 to the AC power supply 220 and to the center electrode 110 of the spark plug 100 and restrains the flow of AC power generated by the AC power supply 220 to the DC power supply 210.

The capacitor 320 of the coupling section 300 electrically connects the AC power supply 220 to the DC power supply 210 and to the center electrode 110 of the spark plug 100 and restrains the flow of DC power generated by the DC power supply 210 to the AC power supply 220. The capacitor 320 is a variable capacitor whose capacitance can be varied. The detailed constitution of the capacitor 320 will be described in detail later.

The ignition control section 500 of the plasma ignition device 20 performs ignition control according to the state of operation of an internal combustion engine in response to control signals output from the operation control section 10. The ignition control section 500 includes a power supply control section 510 and a capacitance control section 520. In the present embodiment, functions of the power supply control section 510 and the capacitance control section 520 of the ignition control section 500 are implemented by means of the CPU (Central Processing Unit) of the ignition control section 500 operating according to programs. However, in another embodiment, at least some functions of the ignition control section 500 may be implemented by means of physical circuits in the ignition control section 500.

The power supply control section 510 of the ignition control section 500 controls the DC power supply 210 and the AC power supply 220 while changing over the ignition mode between the first ignition mode and the second ignition mode, in response to control signals output from the operation control section 10. In the first ignition mode, in order to generate AC plasma after generation of spark discharge between the electrodes of the spark plug 100, the power supply control section 510 instructs the DC power supply 210 to generate DC power and instructs the AC power supply 220 to generate AC power. In the second ignition mode, in order to generate spark discharge only without generation of AC plasma between the electrodes of the spark plug 100, the power supply control section 510 instructs the DC power supply 210 to generate DC power and instructs the AC power supply 220 to halt the generation of AC power.

The capacitance control section 520 of the ignition control section 500 varies the capacitance of the capacitor 320 of the coupling section 300 according to a changeover between the ignition modes which is carried out by the power supply control section 510. In the second ignition mode, the capacitance control section 520 reduces the capacitance of the capacitor 320 as compared with the first ignition mode. In other words, in the first ignition mode, the capacitance control section 520 increases the capacitance of the capacitor 320 as compared with the second ignition mode.

Figure 2:
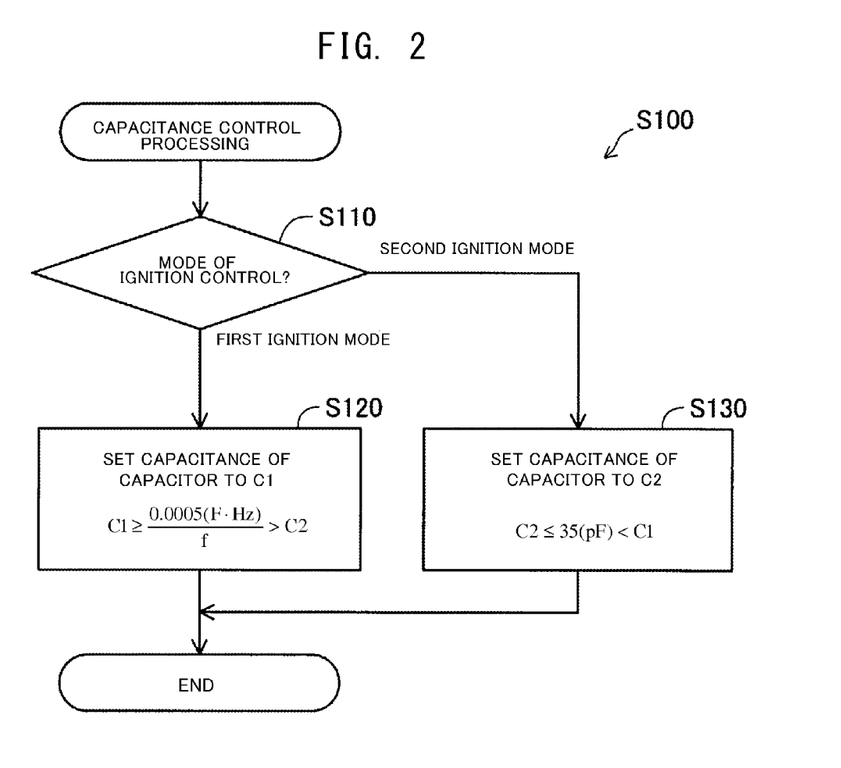
FIG. 2 Flowchart showing capacitance control processing which a capacitance control section executes.

FIG. 2 is a flowchart showing capacitance control processing (step S100) which the capacitance control section 520 executes. Capacitance control processing (step S100) varies the capacitance of the capacitor 320 of the coupling section 300 according to a changeover between the ignition modes which is carried out by the power supply control section 510. In the present embodiment, the capacitance control section 520 executes capacitance control processing (step S100) according to a changeover between the ignition modes. However, in another embodiment, the capacitance control section 520 may periodically execute capacitance control processing (step S100).

When the capacitance control section 520 starts capacitance control processing (step S100), the capacitance control section 520 judges the ignition mode according to the state of operation of the power supply control section 510 (step S110). When the current ignition mode is the first ignition mode (step S110: "first ignition mode"), the capacitance control section 520 sets the capacitance of the capacitor 320 to C1 (step S120). When the current ignition mode is the second ignition mode (step S110: "second ignition mode"), the capacitance control section 520 sets the capacitance of the capacitor 320 to C2 (step S130). The capacitance C1 and the capacitance C2 satisfy the relational expression "C1>C2."

In order to restrain flow of AC power to the DC power supply 210, preferably, the capacitance C1 of the capacitor 320 in the first ignition mode and the frequency f of AC power generated by the AC power supply 220 satisfy the relational expression "C1≤0.0005 (F·Hz)/f." In order to restrain erosion of an electrode caused by spark discharges in the spark plug 100, preferably, the capacitance C2 of the capacitor 320 in the second ignition mode is 35 pF or less. Evaluation of the capacitance C2 will be described in detail later.

Figure 3:
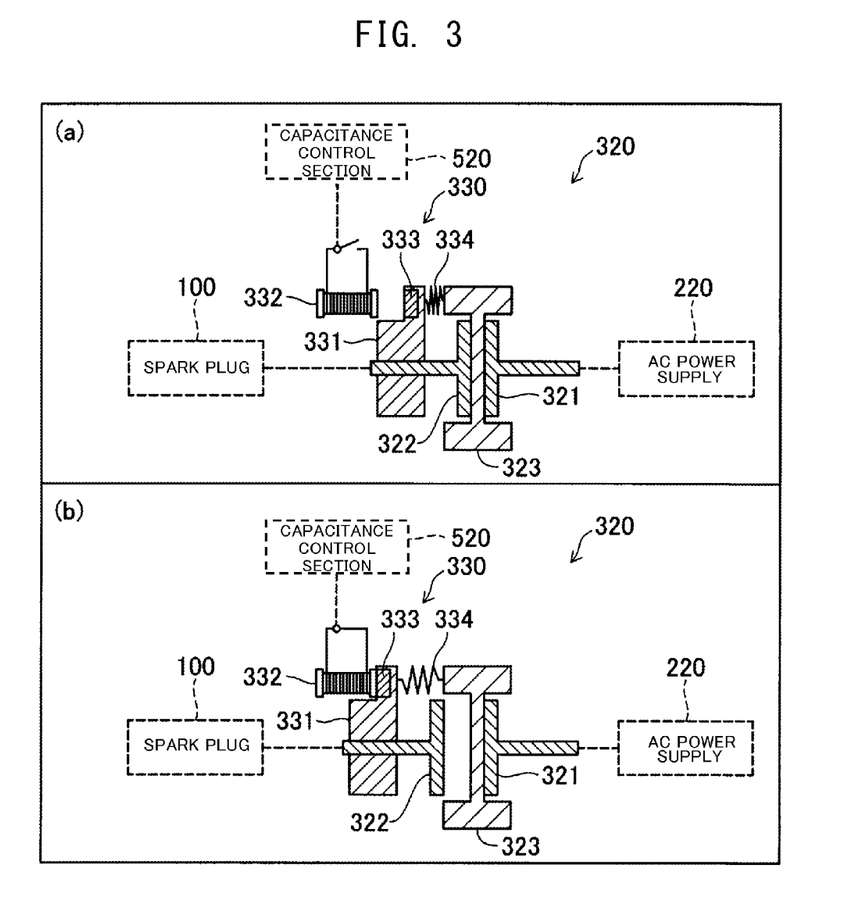
FIG. 3 A pair of explanatory views showing, in detail, the constitution of a capacitor in an embodiment.

FIG. 3 is a pair of explanatory views showing, in detail, the constitution of the capacitor 320 in the present embodiment. FIG. 3(a), an upper view in FIG. 3, shows the section of the capacitor 320 in the first ignition mode. FIG. 3(b), a lower view in FIG. 3, shows the section of the capacitor 320 in the second ignition mode.

The capacitor 320 of the coupling section 300 includes a first electrode 321, a second electrode 322, a dielectric 323, and an electromagnetic actuator 330. The first electrode 321 of the capacitor 320 is electrically connected to the AC power supply 220. The second electrode 322 of the capacitor 320 is electrically connected to the spark plug 100. The dielectric 323 is provided between the first electrode 321 and the second electrode 322. In the present embodiment, the surface of the first electrode 321 and the surface of the dielectric 323 which face each other, and the surface of the second electrode 322 and the surface of the dielectric 323 which face each other, are planes. This allows a reduction in the size of the capacitor 320.

The electromagnetic actuator 330 of the capacitor 320 moves the second electrode 322 in response to a control signal from the capacitance control section 520 so as to increase the distance between the first electrode 321 and the second electrode 322 in the second ignition mode as compared with the first ignition mode. Thus, in the second ignition mode, the capacitance of the capacitor 320 is reduced as compared with the first ignition mode. In the present embodiment, the electromagnetic actuator 330 moves only the second electrode 322. However, in another embodiment, the electromagnetic actuator 330 may move only the first electrode 321 or may move both of the first electrode 321 and the second electrode 322.

In the present embodiment, the electromagnetic actuator 330 includes an electrode holder 331, an electromagnet 332, a permanent magnet 333, and a spring 334. The electrode holder 331 of the electromagnetic actuator 330 holds the second electrode 322. In response to control signals from the capacitance control section 520, the electromagnet 332 of the electromagnetic actuator 330 is de-energized and loses magnetic force in the first ignition mode, and is energized and generates magnetic force in the second ignition mode. The permanent magnet 333 of the electromagnetic actuator 330 is provided on the electrode holder 331 at a position which faces the electromagnet 332. The spring 334 of the electromagnetic actuator 330 is provided between the electrode holder 331 and the dielectric 323 and pulls the electrode holder 331 toward the dielectric 323.

In the first ignition mode, the tensile force of the spring 334 pulls the electrode holder 331 toward the dielectric 323, whereby the second electrode 322 comes into close proximity to the dielectric 323. In the second ignition mode, the magnetic force which attracts the electromagnet 332 and the permanent magnet 333 to each other overcomes the tensile force of the spring 334, thereby separating the electrode holder 331 from the dielectric 323; as a result, the second electrode 322 moves away from the first electrode 321 and the dielectric 323, thereby forming a gap in relation to the dielectric 323. By virtue of the gap between the second electrode 322 and the dielectric 323, variation in capacitance with the distance between the first electrode 321 and the second electrode 322 can be increased.

B. Evaluation of Capacitance C2 in Second Ignition Mode

Figure 4:
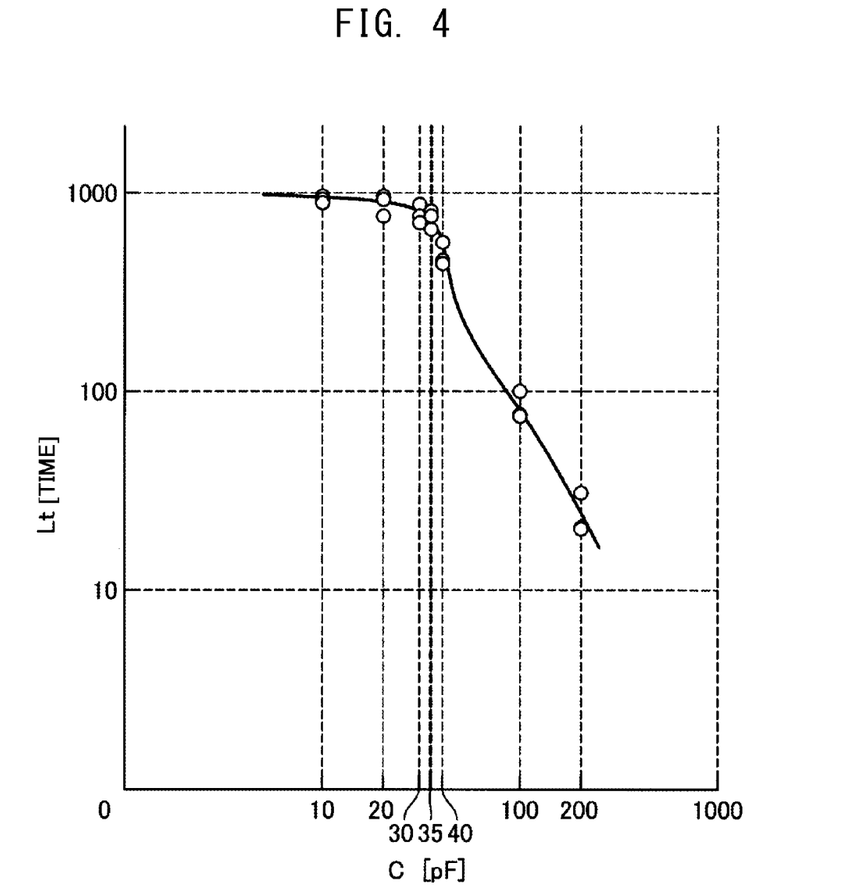
FIG. 4 Explanatory graph showing the results of an evaluation test on the relation between the capacitance of the capacitor and the service life of the spark plug.

FIG. 4 is an explanatory graph showing the results of an evaluation test on the relation between the capacitance C of the capacitor 320 and the service life of the spark plug 100. In FIG. 4, the capacitance C of the capacitor 320 is plotted along the horizontal axis of logarithmic scale, and the service life Lt of the spark plug 100 is plotted along the vertical axis of logarithmic scale, thereby illustrating the relation between the capacitance C of the capacitor 320 and the service life Lt of the spark plug 100.

In the evaluation test whose results are shown in FIG. 4, a plurality of plasma ignition devices 20 whose capacitors 320 differed in the capacitance C were prepared, and the spark plugs 100 were measured for the service life Lt while spark discharges were generated between the electrodes of the spark plugs 100 by use of the plasma ignition devices 20. Specifically, in a state in which the center electrode 110 and the ground electrode 120 of each of the spark plugs 100 were exposed to a 0.4 MPa (megapascal) atmosphere, the DC power supply 210 generated 50 mJ (millijoule) DC power at a cycle of 100 Hz (hertz), thereby continuously generating spark discharges between the electrodes of the spark plug 100. In this condition, time which elapsed until the spark discharge gap between the center electrode 110 and the ground electrode 120 expanded from 1.1 mm (millimeters) to 1.3 mm was measured and taken as the service life Lt of the spark plug 100.

As shown in FIG. 4, at a capacitance C of 10 pF, the spark plugs 100 exhibited a service life Lt of 850 hours to 950 hours, and the service life Lt of the spark plugs 100 deteriorated as the capacitance C increased. At a capacitance C of 20 pF, the spark plugs 100 exhibited a service life Lt of 750 hours to 950 hours; at a capacitance C of 30 pF, the spark plugs 100 exhibited a service life Lt of 700 hours to 850 hours; and at a capacitance C of 35 pF, the spark plugs 100 exhibited a service life Lt of 650 hours to 820 hours. At a capacitance C in excess of 35 pF, the degrees of deterioration in the service life Lt of the spark plugs 100 increased. At a capacitance C of 40 pF, the spark plugs 100 deteriorated in the service life Lt to 450 hours to 550 hours. At a capacitance C of 100 pF, the spark plugs 100 exhibited a service life Lt of 75 hours to 100 hours. At a capacitance C of 200 pF, the spark plugs 100 exhibited a service life Lt of 20 hours to 30 hours.

According to the above-mentioned results of the evaluation test in FIG. 4, the capacitance C of the capacitor 320 is preferably 35 pF or less, more preferably 30 pF or less, far more preferably 20 pF or less, and most preferably 10 pF or less.

C. Effects

According to the plasma ignition device 20 described above, the capacitance control section 520 executes capacitance control processing (step S100) such that the capacitance of the capacitor 320 is reduced in the second ignition mode in which transmission of AC power to the spark plug 100 is halted, as compared with the first ignition mode in which AC power is transmitted to the spark plug 100; therefore, erosion of an electrode caused by spark discharges can be restrained. As a result, the spark plug 100 which generates spark discharges and AC plasma can improve its service life.

Also, since the electromagnetic actuator 330 varies the distance between the first electrode 321 and the second electrode 322, varying the capacitance of the capacitor 320 can sufficiently follow a changeover between the first ignition mode and the second ignition mode.

D. Modification 1

Figure 5:
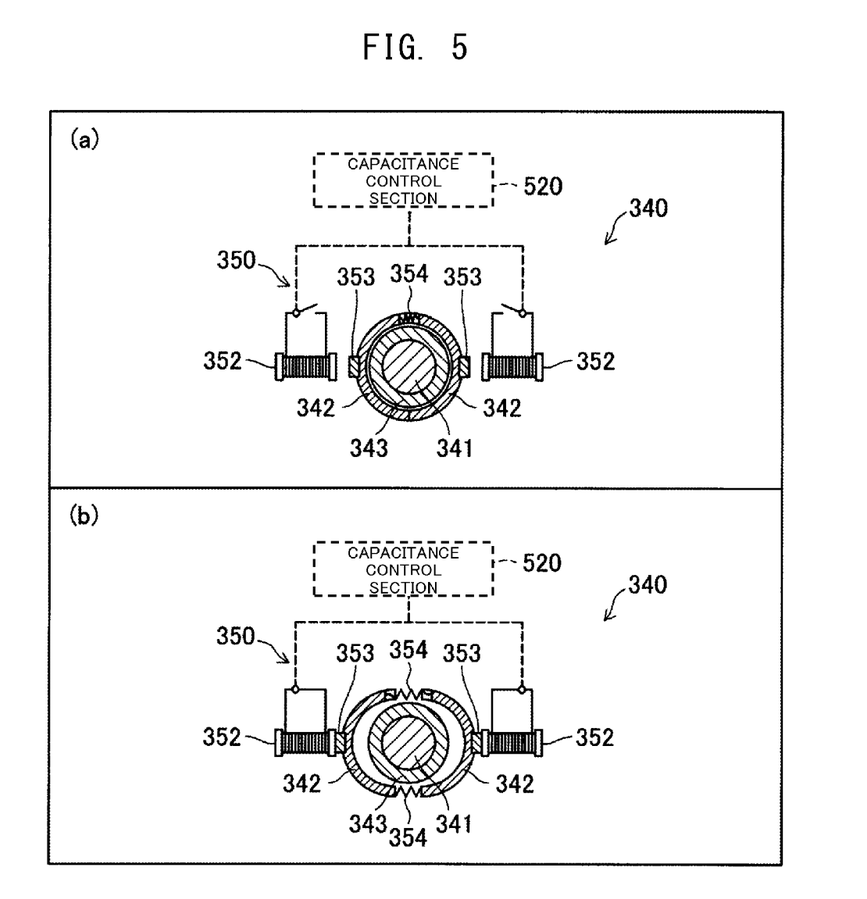
FIG. 5 A pair of explanatory views showing, in detail, the constitution of a capacitor in modification 1.

FIG. 5 is a pair of explanatory views showing, in detail, the constitution of a capacitor 340 in modification 1. The plasma ignition device 20 of modification 1 is similar to that of the embodiment described above except that the capacitor 340 of FIG. 5 is used in place of the capacitor 320. FIG. 5(a), an upper view in FIG. 5, shows the section of the capacitor 340 in the first ignition mode. FIG. 5(b), a lower view in FIG. 5, shows the section of the capacitor 340 in the second ignition mode.

The capacitor 340 in modification 1 includes a first electrode 341, a second electrode 342, a dielectric 343, and an electromagnetic actuator 350. The first electrode 341 of the capacitor 340 is a circular columnar conductor and is electrically connected to the AC power supply 220. The dielectric 343 of the capacitor 340 has such a cylindrical shape as to surround the external circumference of the circular columnar first electrode 341. The second electrode 342 of the capacitor 340 includes two semicylindrical members, whose semicylindrical shapes are formed by dividing a cylindrical shape which surrounds the external circumference of the cylindrical dielectric 343, along the center axis of the cylindrical shape. These members are electrically connected to the spark plug 100.

The electromagnetic actuator 350 of the capacitor 340 radially moves the second electrode 342 in response to a control signal from the capacitance control section 520, thereby increasing the distance between the first electrode 341 and the second electrode 342 in the second ignition mode as compared with the first ignition mode. Thus, the capacitor 340 reduces in capacitance in the second ignition mode as compared with the first ignition mode.

The electromagnetic actuator 350 includes two electromagnets 352, two permanent magnets 353, and springs 354. In response to control signals from the capacitance control section 520, the two electromagnets 352 of the electromagnetic actuator 350 are de-energized and lose magnetic force in the first ignition mode, and are energized and generate magnetic force in the second ignition mode. The two permanent magnets 353 of the electromagnetic actuator 350 are provided on the respective members of the second electrode 342 at respective positions which face the respective electromagnets 352. The springs 354 of the electromagnetic actuator 350 is provided between the two members of the second electrode 342 and pulls the second electrode 342 toward the dielectric 343.

In the first ignition mode, the tensile force of the spring 354 pulls the members of the second electrode 342 toward the dielectric 343, whereby the second electrode 342 comes into close proximity to the dielectric 343. In the second ignition mode, the magnetic force which attracts each of the electromagnets 352 and each of the permanent magnets 353 to each other overcomes the tensile force of the spring 354, thereby separating the members of the second electrode 342 from the dielectric 343; as a result, the second electrode 342 moves away from the first electrode 341 and the dielectric 343, thereby forming a gap in relation to the dielectric 343. By virtue of the gap between the second electrode 342 and the dielectric 343, variation in capacitance with the distance between the first electrode 341 and the second electrode 342 can be increased.

Similar to the aforementioned embodiment, according to the plasma ignition device 20 of modification 1 described above, erosion of an electrode caused by spark discharges can be restrained; as a result, the spark plug 100 which generates spark discharges and AC plasma can improve its service life. Also, since the electromagnetic actuator 350 varies the distance between the first electrode 341 and the second electrode 342, varying the capacitance of the capacitor 340 can sufficiently follow a changeover between the first ignition mode and the second ignition mode.

E. Modification 2

Figure 6:
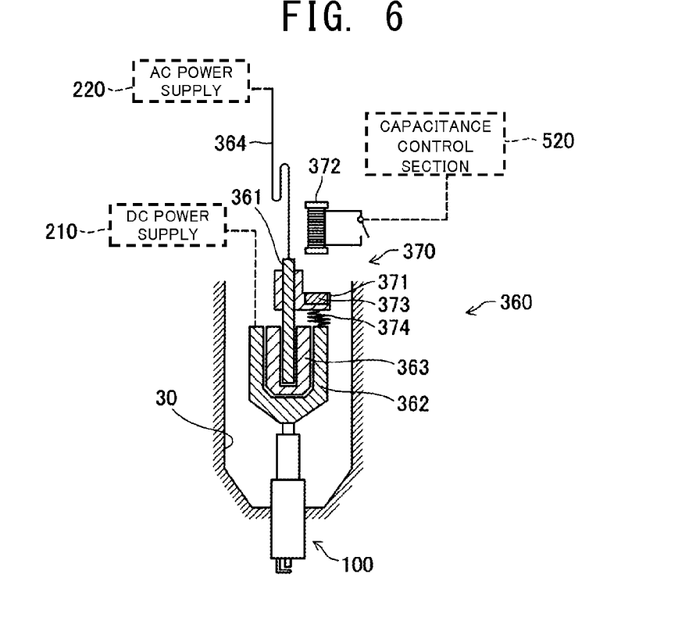
FIG. 6 Explanatory view showing, in detail, the constitution of a capacitor in modification 2.
Figure 7:
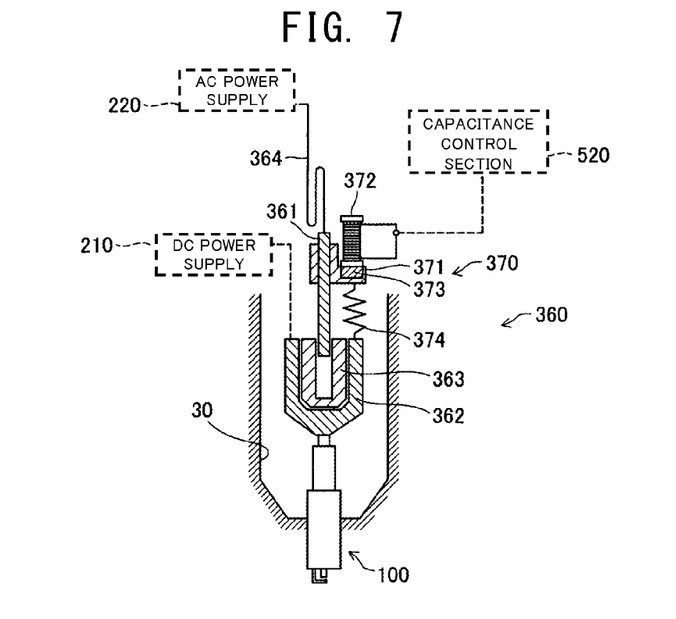
FIG. 7 Explanatory view showing, in detail, the constitution of a capacitor in modification 2.

FIGS. 6 and 7 are explanatory views showing, in detail, the constitution of a capacitor 360 in modification 2. The plasma ignition device 20 of modification 2 is similar to that of the aforementioned embodiment except that the capacitor 360 of FIGS. 6 and 7 is used in place of the capacitor 320. FIG. 6 shows the section of the capacitor 360 in the first ignition mode. FIG. 7 shows the section of the capacitor 360 in the second ignition mode.

The capacitor 360 in modification 2, together with the spark plug 100, is accommodated in a plug hole 30. The capacitor 360 includes a first electrode 361, a second electrode 362, a dielectric 363, a power line 364, and an electromagnetic actuator 370.

The first electrode 361 of the capacitor 360 is a circular columnar conductor and is electrically connected to the AC power supply 220 via the power line 364. The dielectric 363 of the capacitor 360 has such a cylindrical shape as to surround the external circumference of the circular columnar first electrode 361. The second electrode 362 of the capacitor 360 has such a cylindrical shape as to surround the external circumference of the cylindrical dielectric 363. The second electrode 362 is electrically connected to the spark plug 100 and the DC power supply 210. The first electrode 361, the second electrode 362, and the dielectric 363 are disposed in such a manner that their center axes are aligned with the axis of the spark plug 100.

The electromagnetic actuator 370 of the capacitor 360 moves the first electrode 361 in the direction of the center axis in response to a control signal from the capacitance control section 520, thereby reducing, in the second ignition mode, an area of the first electrode 361 which is in close proximity to the dielectric 363, as compared with the first ignition mode. Thus, the capacitor 360 reduces in capacitance in the second ignition mode as compared with the first ignition mode.

The electromagnetic actuator 370 includes an electrode holder 371, an electromagnet 372, a permanent magnet 373, and a spring 374. The electrode holder 371 of the electromagnetic actuator 370 holds the first electrode 361. In response to control signals from the capacitance control section 520, the electromagnet 372 of the electromagnetic actuator 370 is de-energized and loses magnetic force in the first ignition mode, and is energized and generates magnetic force in the second ignition mode. The permanent magnet 373 of the electromagnetic actuator 370 is provided on the electrode holder 371 at a position which faces the electromagnet 372. The spring 374 of the electromagnetic actuator 370 is provided between the electrode holder 371 and the second electrode 362 and pulls the electrode holder 371 toward the second electrode 362.

In the first ignition mode, the tensile force of the spring 374 pulls the electrode holder 371 toward the dielectric 363, whereby the first electrode 361 is inserted deep into the dielectric 363. In the second ignition mode, the magnetic force which attracts the electromagnet 372 and the permanent magnet 373 to each other overcomes the tensile force of the spring 374, thereby moving the electrode holder 371 away from the second electrode 362; as a result, a portion of the first electrode 361 is drawn out from the dielectric 363. In the second ignition mode, the power line 364 connected to the first electrode 361 is distorted in the axial direction of the first electrode 361 so as to follow the movement of the first electrode 361.

Similar to the aforementioned embodiment, according to the plasma ignition device 20 of modification 2 described above, erosion of an electrode caused by spark discharges can be restrained; as a result, the spark plug 100 which generates spark discharges and AC plasma can improve its service life. Also, since the electromagnetic actuator 370 varies the area of the first electrode 361 which is in close proximity to the dielectric 363, varying the capacitance of the capacitor 360 can sufficiently follow a changeover between the first ignition mode and the second ignition mode. Also, since the capacitor 360 has such a circular columnar shape as to be compatible with the plug hole 30, the capacitor 360 can be readily mounted into the plug hole 30.

F. Modification 3

Figure 8:
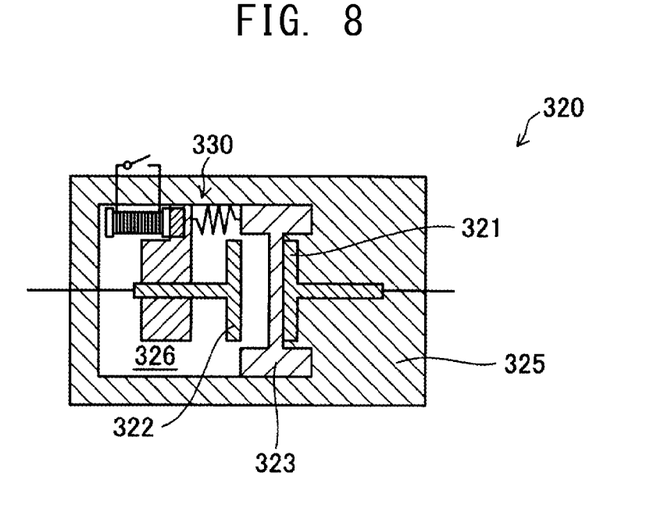
FIG. 8 Explanatory view showing, in detail, the constitution of a capacitor in modification 3.

FIG. 8 is an explanatory view showing, in detail, the constitution of the capacitor 320 in modification 3. The plasma ignition device 20 of modification 3 is similar to that of the aforementioned embodiment except for the constitution of the capacitor 320. The capacitor 320 of modification 3 is similar to that of the aforementioned embodiment except that an insulation mold 325 and an insulation oil 326 are further provided.

The insulation mold 325 of the capacitor 320 is a member which is formed from an insulation material and in which the first electrode 321, the second electrode 322, the dielectric 323, and the electromagnetic actuator 330 are sealed. The insulation material used to form the insulation mold 325 is insulation rubber. However, in another embodiment, the insulation material may be insulation resin.

The insulation oil 326 of the capacitor 320 is charged into the insulation mold 325 and fills the gap between the second electrode 322 and the dielectric 323. In another embodiment, the gap between the first electrode 321 and the dielectric 323, if any, may be filled with the insulation oil 326.

Similar to the aforementioned embodiment, according to the plasma ignition device 20 of modification 3 described above, erosion of an electrode caused by spark discharges can be restrained; as a result, the spark plug 100 which generates spark discharges and AC plasma can improve its service life. Also, the employment of the insulation mold 325 and the insulation oil 326 can improve the dielectric strength of the capacitor 320.

G. Other Embodiments

While the present invention has been described with reference to the embodiment, the present invention is not limited thereto, but may be embodied in various other forms without departing from the gist of the invention. For example, the capacitor of the coupling section 300 is not limited to those which utilize the electromagnetic actuator, but may be such that the facing area between electrode plates or the distance between electrodes is varied through rotation of a shaft. Also, the insulation mold 325 and the insulation oil 326 of modification 3 may be applied to the capacitor 340 of modification 1 and to the capacitor 360 of modification 2. Modification 3 employs both of the insulation mold 325 and the insulation oil 326; however, even when only one of the insulation mold 325 and the insulation oil 326 is employed, dielectric strength can be improved. Also, in the aforementioned embodiment and modifications 1 to 3, the electrodes of the capacitor 320 may be connected in reverse; specifically, the first electrode may be connected to the spark plug 100, and the second electrode may be connected to the AC power supply 220.

DESCRIPTION OF REFERENCE NUMERALS

10: operation control section
20: plasma ignition device
30: plug hole
100: spark plug
110: center electrode
120: ground electrode
210: DC power supply
220: AC power supply
300: coupling section
310: inductor
320: capacitor
321: first electrode
322: second electrode
323: dielectric
325: insulation mold
326: insulation oil
330: electromagnetic actuator
331: electrode holder
332: electromagnet
333: permanent magnet
334: spring
340: capacitor
341: first electrode
342: second electrode
343: dielectric
350: electromagnetic actuator
352: electromagnet
353: permanent magnet
354: spring
360: capacitor
361: first electrode
362: second electrode
363: dielectric
364: power line
370: electromagnetic actuator
371: electrode holder
372: electromagnet
373: permanent magnet
374: spring
500: ignition control section
510: power supply control section
520: capacitance control section

The invention claimed is:

1. A plasma ignition device comprising:
a spark plug;
a DC power supply for generating DC power used to generate spark discharge between electrodes of the spark plug;
an AC power supply for generating AC power used to generate AC plasma between the electrodes between which the spark discharge has been generated; and
a coupling section which couples the DC power and the AC power together and transmits resultant coupled power to the spark plug and which includes a capacitor for electrically connecting the AC power supply to the DC power supply and to the spark plug;
the plasma ignition device further comprising:
a power supply control section for controlling the DC power supply and the AC power supply while making a changeover between a first ignition mode in which the AC power is transmitted to the spark plug, and a second ignition mode in which transmission of the AC power to the spark plug is halted, and
a capacitance control section for reducing, in the second ignition mode, capacitance of the capacitor as compared with that in the first ignition mode.

2. A plasma ignition device according to claim 1, wherein the capacitor has a capacitance of 35 pF or less in the second ignition mode.

3. A plasma ignition device according to claim 1, wherein:
a frequency f of the AC power satisfies a relational expression 50 kHz≤f≤100 MHz, and
the capacitor has a capacitance of 0.0005 (F·Hz)/f or more in the first ignition mode.

4. A plasma ignition device according to claim 1, wherein:
the capacitor is a variable capacitor whose capacitance can be varied, and the capacitor includes:
a first electrode electrically connected to the AC power supply;
a second electrode electrically connected to the spark plug;
a dielectric provided between the first electrode and the second electrode; and
an electromagnetic actuator for moving at least one of the first electrode and the second electrode in response to a control signal from the capacitance control section.

5. A plasma ignition device according to claim 4, wherein a surface of the first electrode and a surface of the dielectric which face each other, and a surface of the second electrode and a surface of the dielectric which face each other, are planes.

6. A plasma ignition device according to claim 4, wherein:
the first electrode has a circular columnar shape;
the dielectric has such a cylindrical shape as to surround an external circumference of the first electrode; and
the second electrode has such a cylindrical shape as to surround an external circumference of the dielectric.

7. A plasma ignition device according to claim 4, wherein:
the second electrode has a circular columnar shape;

the dielectric has such a cylindrical shape as to surround an external circumference of the second electrode; and the first electrode has such a cylindrical shape as to surround an external circumference of the dielectric.

8. A plasma ignition device according to claim 4, wherein an electrode moved by the electromagnetic actuator comes into close proximity to the dielectric in the first ignition mode and forms a gap in relation to the dielectric in the second ignition mode.

9. A plasma ignition device according to claim 4, wherein the gap between the dielectric and at least one of the first electrode and the second electrode is filled with insulation oil.

10. A plasma ignition device according to claim 4, wherein the capacitor is sealed in an insulation material.

11. A plasma ignition method in which spark discharge is generated between electrodes of a spark plug by means of DC power generated by a DC power supply, and, by means of AC power generated by an AC power supply, AC plasma is generated between the electrodes between which the spark discharge has been generated, the method being characterized in that:

the DC power supply and the AC power supply are controlled while a changeover is made between a first ignition mode in which the AC power is transmitted to the spark plug, and a second ignition mode in which transmission of the AC power to the spark plug is halted, and a capacitor which electrically connects the AC power supply to the DC power supply and to the spark plug is reduced in capacitance in the second ignition mode as compared with the first ignition mode.

* * * * *